United States Patent [19]

Giovachini et al.

[11] Patent Number: 4,587,841
[45] Date of Patent: May 13, 1986

[54] HYDRODYNAMIC TEST APPARATUS

[75] Inventors: Jean-Luc Giovachini, Paris; Jean-Paul Varnier, Versailles; Jean-Claude Dern, Paris; Pierre-Loïc Le Guet, Bures sur Yvette; Jean-Pierre Pascal, Paris, all of France

[73] Assignee: Etat Francais, Paris, France

[21] Appl. No.: 703,481

[22] Filed: Feb. 20, 1985

[30] Foreign Application Priority Data

Feb. 22, 1984 [FR] France ................. 84 02647

[51] Int. Cl.[4] ............................ G01M 10/00
[52] U.S. Cl. ............................... 73/148
[58] Field of Search ........................ 73/148

[56] References Cited

U.S. PATENT DOCUMENTS

| 3,052,120 | 9/1962 | Goodman et al. ............ 73/148 |
| 3,463,002 | 8/1969 | Bugg ........................ 73/148 X |
| 3,691,781 | 9/1972 | Edwards, Jr. et al. ........ 73/148 X |
| 3,916,813 | 11/1975 | Stahl ....................... 73/148 X |

FOREIGN PATENT DOCUMENTS

| 100751 | 6/1983 | Japan ....................... 73/148 |
| 46832 | 3/1984 | Japan ....................... 73/148 |
| 198015 | 8/1967 | U.S.S.R. ................... 73/148 |
| 447321 | 12/1974 | U.S.S.R. ................... 73/148 |
| 450088 | 3/1975 | U.S.S.R. ................... 73/148 |
| 617317 | 7/1978 | U.S.S.R. ................... 73/148 |

Primary Examiner—Stewart J. Levy
Assistant Examiner—Tom Noland
Attorney, Agent, or Firm—Parkhurst & Oliff

[57] ABSTRACT

A hydrodynamic test apparatus including a model support which comprises a submerged frame equipped with rollers and resting on the bottom of a tank is disclosed. A removable plate is attached to the top of the frame and a linear induction motor is attached to the side of the frame. The linear induction motor is supplied with current by conductor rails affixed to the bottom of the tank.

15 Claims, 5 Drawing Figures

HYDRODYNAMIC TEST APPARATUS

BACKGROUND OF THE INVENTION

The present invention relates to a hydrodynamic test apparatus.

Just as there are wind tunnels for the aerodynamic testing of ground or air equipment, there are hydrodynamic test apparatus for research on the behavior of partially or totally submerged mobile equipment.

Certain of these apparatus include a tunnel delimiting a liquid vein set in motion by appropriate means. There must be a considerable difference, however, between the diameter of the liquid vein and the maximum diameter of the model to be tested. Otherwise, measurements on the model will be distorted by the tunnel walls those presence modifies the flow of liquid in the vein. To obtain this considerable difference, one can use a vein of large dimensions, but it is very difficult to ensure a steady flow of water over the entire cross section of such a vein. Moreover, such facilities are predicated on moving a very large quantity of liquid and are, therefore, very expensive. It is also possible to use very small-scale models, but then the correspondence of the model to the original is rather low and the tests therefore are not useful for practical operations.

Therefore, test facilities have been contemplated, in particular for nautical keels, in which a test model is mounted on a support. The support is generally an overhead crane which moves over a tank of standing water. Equipment of this type is very satisfactory for conducting model tests of mobile equipment which is partly submerged and partly not submerged. In this case, it is possible to attach a model to a support at the non-submerged part of the model and the movement of the support does not cause any disturbance around the submerged part of the model, which is the only part being tested.

Such types of apparatus do, however, have drawbacks for research on totally submerged models such as models of submarines or models of towed equipment such as a buoy. The support must be sufficiently rigid to avoid oscillating or vibrating under the effect of the flow of water. Such a high degree of rigidity assumes that the support will be rather large. The support will thus distort the range of speeds around the model, first, because of the volume of water displaced, and secondly, because of the disturbances created at the level where the support traverses the surface of the fluid.

Given these difficulties and considering that research models very often have places of symmetry not intersected by any velocity vector components, it was thought that satisfactory modelling would be obtained by moving a symmetrical plane half-scale model mounted on a plate which is essentially parallel to the bottom of a tank. It is turned out to be very difficult, however, to achieve steady movement of a submerged platform whose resistance to forward movement is very high and is modulated by the influence of the sea state simulated in the tank.

In particular, towing a test stand by means of a cable proved ineffective because of the elasticity of small cables and the excessive disturbances caused by thick cables. It also proved impossible to move a platform holder by means of a motor-driven rollers because the rollers would slip on the bottom of the tank or along their support rails. Finally, the towing of a submerged platform was contemplated by means of battery-driven electric motors in the manner of torpedoes. Structures of this type, however, have not proved satisfactory due to the short life and bulkiness of the batteries, which disturbs the flow of water around the model.

SUMMARY OF THE INVENTION

An object of the present invention is to offer a hydrodynamic test apparatus which allows sufficiently steady movement of a submerged model and minimizes disturbances of relative flow around the model.

According to the present invention, a hydrodynamic test apparatus comprises a tank filled with water in which is immersed a test model support. The test model support comprises a frame equipped with large rollers resting on the bottom of the tank, a removable plate attached to the top of the frame and a linear induction motor attached to the side of the frame. The linear induction motor is supplied with current by conductor rails affixed to the bottom of the tank.

Quite unexpectedly, it was found to be possible to drive a frame in the bottom of a water-filled tank by means of a linear induction motor and thereby obtain extremely steady movement of the frame. Also, it was found that the removable plate allowed the necessary wiring for the model to be installed outside the tank and allowed the model to be easily mounted on the frame.

According to a preferred embodiment of the present invention, the frame comprises side members in the form of caissons which are connected by crossbars. In this embodiment, the side members house the accessories needed to hold the removable plate in place or the accessories for the operation of the submerged platform while allowing the platform to remain compact and cause only mild disturbances of water flow around the model.

According to another preferred embodient of the present invention, the crossbars have the same thickness as the removable plate. Thus, the crossbars and the removable plate are almost flush and thereby promote good water flow around the model. In a further preferred embodiment of the present invention, the plate has a central opening so that it is possible to install some measuring instruments in the thickness of the plate or even to have them project below it.

BRIEF DESCRIPTION OF THE DRAWINGS

Further characteristics and advantages of the invention will be apparent from the following description and the attached drawings in which.

DETAILED DESCRIPTION OF THE PREFERRED EMBODIMENT

Figure 1:
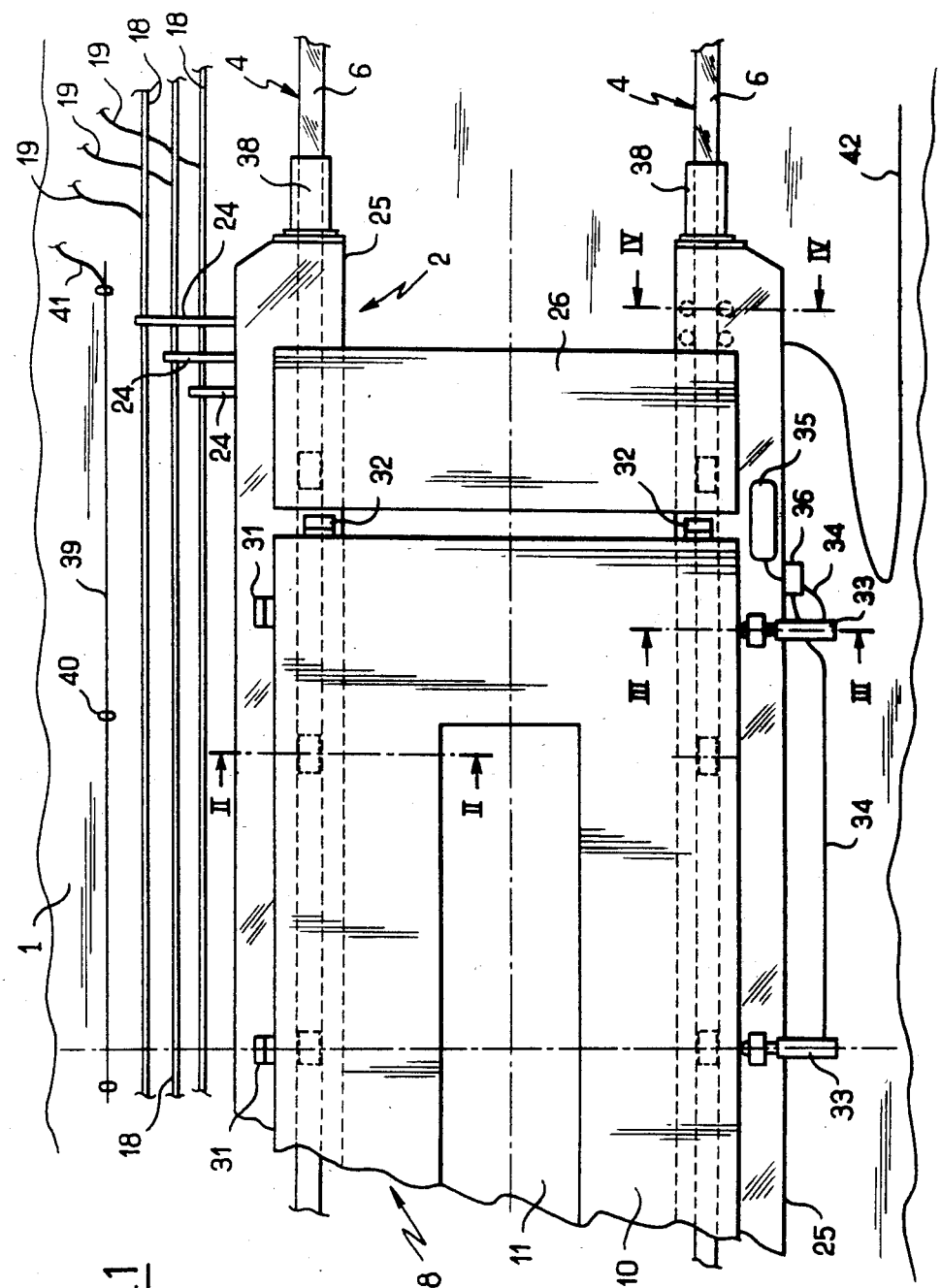
FIG. 1 is a partial top view of the apparatus of the present invention.
Figure 2:
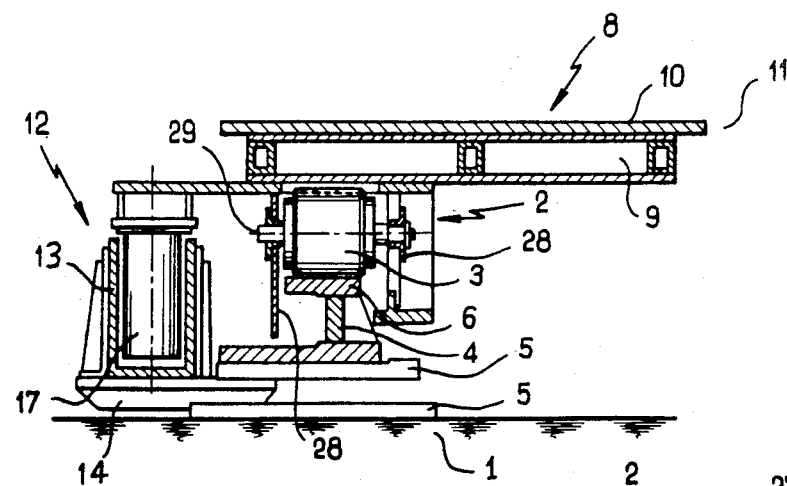
FIG. 2 shows an enlarged partial cross-section corresponding to plane II—II of FIG. 1.
Figure 4:
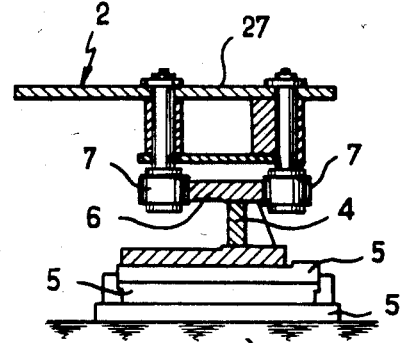
FIG. 4 shows an enlarged partial cross-section of place IV—IV of FIG. 1.

With reference to the drawings, the apparatus of the present invention includes a tank having a bottom as shown in FIG. 1. In FIG. 1 only a portion of tank bottom 1 has been depicted. As an example, the apparatus of the present invention was installed in a rectangular tank 220 meters long, 13 meters wide and 4 meters deep. As shown in FIG. 2, the apparatus also includes a test model support which comprises a frame indicated generally at 2 which is equipped with rollers 3. The rollers 3 rest on the bottom 1 of the tank. In the example shown, the rollers 3 rest on the bottom 1 of the tank by means of rails 4 supported on the bottom of the tank by adjusting plates 5. The rails 4 have flat heads 6 on which the rollers 3 rest. As shown in FIG. 4, the sides of the flat heads 6 of the rails 4 are machined to allow guidance by vertical rollers 7 mounted on the frame 2 on either side of the rail 4.

As shown in FIG. 2, a removable plate 8, intended to hold a model, is attached to the top of the frame 2. Preferably, this plate includes a thick reinforced caisson 9, thus forming a tubular frame to which a deck 10 is affixed. The test models and instruments such as scales for measuring stress, are mounted on the deck 10. As an example, a plate was made which was 5 meters in length, 2.33 meters wide and 10 cm thick. The plate 8 has a central opening 11 which can house measuring instruments within the thickness of the plate or allow them to project slightly below the plate in such a manner as not to disturb the flow of water around the part of the model facing the water surface and along which measurements are carried out.

Figure 3:
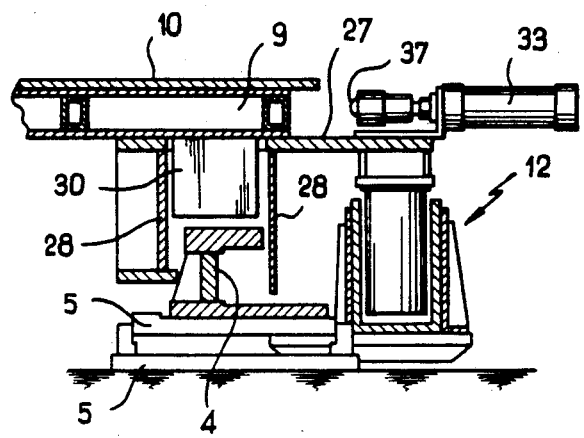
FIG. 3 shows an enlarged partial cross-section corresponding to the plane III—III of FIG. 1.

As shown in FIGS. 2 and 3, a linear induction motor 12 extends along each side of frame 2. The linear induction motors 12 include an induction rail 13 attached to fasteners 14. The fasteners 14 are inserted at regular intervals between two adjusting plates 5 supporting the rail 4. Each rail 13 has a U shaped steel support structure protected against corrosion by an appropriate coating such as a layer of polyamide.

The induction rail itself is comprised of a sheet of copper bent into a U shape and inserted into the steel support. An inductor 17 is attached to the frame 2 and extends into the induction rail 13.

In the preferred apparatus, four 7-terminal asynchronous motors (Guimbal system) were connected in parallel and mounted on either side of the frame 2. Also, two contiguous motors were placed on each side of the frame for a total of 14 consecutive terminals. The motors were supplied with three-phased voltage of 0 to 80 volts between phases, and a current of 0 to 600 amperes by conductor rails 18 fixed to the bottom 1 of the tank and connected by cables 19 to a power source outside the tank.

Figure 5:
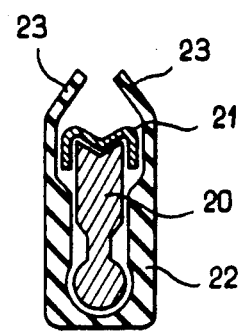
FIG. 5 shows an enlarged cross-section of a conductor rail.

Preferably, the conductor rails 18 should be similar to those used for powering trolleys. As shown in FIG. 5, the conductor rails 18 include an aluminum core conductor 20 on which is set a contact section 21 which protects the core conductor 20 from abrasion by commutator brushes (not shown). The entire core conductor, outside the friction area, is protected by paint and covered with a rubber casing 22. The rubber casing 22 has upturned rims 23 which spread apart to allow a commutator brush to pass through. Commutator brushes in contact with the conductor rails 18 are supported by brackets 24 mounted on one side of the frame 2. The motor itself is regulated by a speed sensor set in the caissons of the frame 2 and is controlled from a console outside the tank which is connected to the submerged platform by a cable 42. The cable 42 also serves to transmit data obtained from the gauges set on the model to a point outside the tank.

As shown in FIG. 1, the frame 2 has girders in the form of caissons 25 connected to one another near their ends by crossbars 26. Preferably the caisson type girders 25 will be upside down U shaped and will be equipped with a top plate 27 and two side plates 28 as shown in FIGS. 2 and 3. The side plates 28 extend along either side of the rails 4 and serve as supports and fairings for the rollers 3 mounted on short axles 29 which form right angles with the side walls 28. As shown in FIG. 3, the upper wall 27 of the frame 2 has an opening between two rollers 3 which allows the insertion between the side walls 28 of a water-tight caisson 30 which is flush against the plate 8. The water-tight caisson contains electronic devices for preamplification of data coming from gauges set on the plate 8.

Preferably the crossbars 26 will have the same structure and same thickness as the plate 8 in order to minimize disturbance of water flow when the platform is in motion.

In a preferred embodiment, the plate 8 is secured to the top of the frame 2 with transverse lateral abutments 31 and longitudinal lateral abutments 32 against which the plate is held in place by transverse pneumatic jacks 33 opposite the abutments 31 and longitudinal pneumatic jacks (not shown) opposite the abutments 32. The pneumatic jacks 33 are mounted on the upper plate 27 of the frame 2 and are connected by tubes 34 to a compressed air cylinder 35 through control box 36 which receives control pulses through the cable 42. For the purpose of clarity, the tubes 34, the compressed air cylinder 35 and the control box 36 have been depicted visibly in FIG. 1, but it would obviously be preferable to insert these components in the caisson formed by the lateral walls 28 of the frame 2.

Preferably, as shown in FIG. 3, a ball 37 is placed at the ends of the transverse pneumatic jack rods 33. The ball 37 is placed in such a way as to turn freely in the end of the rod, so that when the jack rod 33 is engaged with the lateral surface of the reinforced caisson 9 of the plate 8, positioning can be accomplished in a transverse direction by the longitudinal pneumatic jacks. At the end of the frame 2, there are safety plugs 38 designed to cooperate with stops (not shown) on the ends of the rails 4 to stop the platform in case the linear induction motor control system 12 fails.

The submerged platform contains extremely diverse metals such as copper, stainless steel, aluminum, and it is therefore necessary to protect these metals against corrosion. A protective coating is used whenever possible but certain parts cannot be covered. To avoid excessively rapid corrosion, the present invention calls for replacing anti-corrosion equipment in the bottom of the tank. The anti-corrosion equipment comprises at least one stainless steel cable 39 supported by insulators 40 and supplied with current by a conductor 41 connected to a source of low voltage direct current such as 5 or 6 volts.

To use the apparatus of the present invention, the frame 2 is installed in the bottom of the tank, then the removable plate 8 holding the model and the measuring instruments is placed on the frame 2 and is fixed to the frame by the transverse and longitudinal pneumatic jacks. The conductor rails 18 are then supplied with electricity. In this regard, it should be noted that it is of course necessary to supply the conductor rails 18 with a stronger current than that necessary to operate the linear induction motor because of conductive losses to the water. Quite surprisingly, it has been found, however, that precise functioning of the linear induction motor can be obtained in conditions of total submersion.

Once the platform is set in place and supplied with electricity, it moves along the rails 4 and the test proceeds according to instructions transmitted by the cable 42.

Many applications for the present invention are possible. In particular the apparatus of the present invention can be used in experimental research on the towing of submerged, semi-submerged, and surface objects such as buoys, linear antennas or sonars. The submerged platform can be used for research on the ejection of objects under water such as torpedoes and amphibious equipment. Furthermore, the apparatus can be used for hydroballistic experimental research, for simulation of aerodynamic flows in which air is replaced by water, and for the simulation of currents for the testing of structures in the sea.

While the present invention has been described in detail and with reference to specific embodiments thereof, it will be apparent to one skilled in the art that various changes and modifications can be made therein without departing from the spirit and scope thereof.

For instance, the removable plate 8 could form a single unit with the frame 2. In this case it would be necessary to remove the platform unit from the tank in order to change the model.

We claim:

1. A hydrodynamic test apparatus for use in a tank filled with water in which a test model support is immersed, comprising:
    a frame having rollers resting on the bottom of said tank;
    a removable plate, said removable plate being attached to said frame; and,
    a linear induction motor, said linear induction motor being attached to said frame and being supplied with electric current from conductor rails affixed to the bottom of said tank.

2. The apparatus of claim 1 wherein said frame has caisson-type side members connected by crossbars.

3. The apparatus of claim 2 wherein said crossbars are of the same thickness as said removable plate.

4. The apparatus of claim 3 wherein said removable plate has a central opening.

5. The apparatus of claim 3 wherein said removable plate is attached to said frame by means of abutments against which said plate is held by pneumatic jacks.

6. The apparatus of claim 3 further comprising anti-corrosion equipment comprising at least one cable placed near said conductor rails and connected to a source of low voltage direct current.

7. The apparatus of claim 2 wherein said removable plate has a central opening.

8. The apparatus of claim 2 wherein said removable plate is attached to said frame by means of abutments against which said plate is held by pneumatic jacks.

9. The apparatus of claim 2 further comprising anti-corrosion equipment comprising at least one cable placed near said conductor rails and connected to a source of low voltage direct current.

10. The apparatus of claim 1 wherein said removable plate has a central opening.

11. The apparatus of claim 10 wherein said removable plate is attached to said frame by means of abutments against which said plate is held by pneumatic jacks.

12. The apparatus of claim 10 further comprising anti-corrosion equipment comprising at least one cable placed near said conductor rails and connected to a source of low voltage direct current.

13. The apparatus of claim 1 wherein said removable plate is attached to said frame by means of abutments against which said plate is held by pneumatic jacks.

14. The apparatus of claim 13 further comprising anti-corrosion equipment comprising at least one cable placed near said conductor rails and connected to a source of low voltage direct current.

15. The apparatus of claim 1 further comprising anti-corrosion equipment comprising at least one cable placed near said conductor rails and connected to a source of low voltage direct current.

* * * * *